(12) United States Patent
Bansal et al.

(10) Patent No.: US 11,188,923 B2
(45) Date of Patent: Nov. 30, 2021

(54) REAL-TIME KNOWLEDGE-BASED WIDGET PRIORITIZATION AND DISPLAY

(71) Applicant: Bank of America Corporation, Charlotte, NC (US)

(72) Inventors: Gaurav Bansal, Kondapur (IN); Shekhar Singh Mehra, New Delhi (IN); Vinod Maghnani, Haryana (IN); Sandeep Kumar Chauhan, Hyderabad (IN)

(73) Assignee: Bank of America Corporation, Charlotte, NC (US)

(*) Notice: Subject to any disclaimer, the term of this patent is extended or adjusted under 35 U.S.C. 154(b) by 221 days.

(21) Appl. No.: 16/555,034

(22) Filed: Aug. 29, 2019

(65) Prior Publication Data

US 2021/0065202 A1 Mar. 4, 2021

(51) Int. Cl.
*G06Q 30/00* (2012.01)
*G06F 9/451* (2018.01)
*G06F 16/9535* (2019.01)
*G06F 3/16* (2006.01)
*G10L 15/22* (2006.01)
(Continued)

(52) U.S. Cl.
CPC ......... *G06Q 30/016* (2013.01); *G06F 3/0484* (2013.01); *G06F 3/167* (2013.01); *G06F 9/451* (2018.02); *G06F 16/9535* (2019.01); *G06Q 10/06316* (2013.01); *G10L 15/22* (2013.01); *G10L 15/26* (2013.01)

(58) Field of Classification Search
CPC ........ G06F 3/0484; G06F 3/167; G06F 9/451; G06F 16/9535; G06Q 10/06316; G06Q 30/016; G10L 15/22; G10L 15/26
See application file for complete search history.

(56) References Cited

U.S. PATENT DOCUMENTS 6,353,817 B1 3/2002 Jacobs et al.
7,761,800 B2 7/2010 Chaudhri et al.
(Continued)

OTHER PUBLICATIONS

Ganu et al., "AgentBuddy: an IR System based on Bandit Algorithms to Reduce Cognitive Load for Customer Care Agents," In Proceedings of the 42nd International ACM SIGIR Conference on Research and Development in Information Retrieval (SIGIR '19), Jul. 21-25, 2019. (4 pages) (Year: 2019).*

*Primary Examiner* — Eric J. Bycer
(74) *Attorney, Agent, or Firm* — Banner & Witcoff, Ltd.; Michael A. Springs

(57) ABSTRACT

Aspects of the disclosure relate to real-time knowledge-based widget prioritization and display. A computing platform may detect, via a computing device, a voice-based interaction between an enterprise agent and a customer. Then, the computing platform may cause, via the computing device, the voice-based interaction to be captured as audio data. The computing platform may then transform the audio data to textual data. Subsequently, the computing platform may identify, in the textual data, a customer query. Then, the computing platform may retrieve, in real-time and based on the voice-based interaction and from a repository of widgets, a first widget, where the first widget includes information at least partially responsive to the customer query. Then, the computing platform may display, to the enterprise agent and via a graphical user interface in use by the enterprise agent, the first widget.

26 Claims, 8 Drawing Sheets

(51) Int. Cl.
*G06F 3/0484* (2013.01)
*G06Q 10/06* (2012.01)
*G10L 15/26* (2006.01)

(56) References Cited

U.S. PATENT DOCUMENTS

| | | | |
|---|---|---|---|
| 9,015,046 B2* | 4/2015 | Pereg | G10L 15/22 |
| | | | 704/251 |
| 9,386,153 B1* | 7/2016 | Koster | H04M 3/5175 |
| 9,753,627 B2 | 9/2017 | Chaudhri et al. | |
| 9,754,016 B1* | 9/2017 | Bozarth | G10L 15/26 |
| 9,912,813 B2 | 3/2018 | Vymenets et al. | |
| 10,091,358 B1 | 10/2018 | Molander et al. | |
| 10,146,513 B2 | 12/2018 | Pyhalammi et al. | |
| 10,244,114 B2 | 3/2019 | Molander et al. | |
| 10,324,609 B2 | 6/2019 | Sanches et al. | |
| 2004/0119754 A1* | 6/2004 | Bangalore | G06F 3/04847 |
| | | | 715/809 |
| 2004/0153373 A1* | 8/2004 | Song | G06Q 30/02 |
| | | | 705/26.1 |
| 2005/0054381 A1* | 3/2005 | Lee | G06F 3/0482 |
| | | | 455/557 |
| 2005/0193055 A1* | 9/2005 | Angel | G06Q 30/02 |
| | | | 709/202 |
| 2007/0019618 A1* | 1/2007 | Shaffer | H04M 3/2236 |
| | | | 370/352 |
| 2007/0050778 A1* | 3/2007 | Lee | G06F 3/0481 |
| | | | 718/107 |
| 2008/0034060 A1* | 2/2008 | Fisher, Jr. | G06Q 30/02 |
| | | | 709/218 |
| 2008/0077558 A1* | 3/2008 | Lawrence | G06F 40/279 |
| 2009/0097634 A1* | 4/2009 | Nambiar | H04M 3/5183 |
| | | | 379/265.09 |
| 2012/0016678 A1* | 1/2012 | Gruber | G06F 9/54 |
| | | | 704/275 |
| 2012/0140255 A1* | 6/2012 | Tanaka | G06F 3/04817 |
| | | | 358/1.13 |
| 2013/0097498 A1* | 4/2013 | Steinberg | G06F 3/0482 |
| | | | 715/708 |
| 2013/0204813 A1* | 8/2013 | Master | G06N 20/00 |
| | | | 706/12 |
| 2013/0211880 A1* | 8/2013 | Kannan | G06Q 30/0203 |
| | | | 705/7.32 |
| 2014/0012626 A1* | 1/2014 | Ajmera | G06Q 10/10 |
| | | | 705/7.31 |
| 2014/0026113 A1* | 1/2014 | Farooqi | G06F 8/34 |
| | | | 717/107 |
| 2014/0108978 A1* | 4/2014 | Yu | G06F 3/04817 |
| | | | 715/765 |
| 2015/0242860 A1* | 8/2015 | Kannan | G06Q 30/02 |
| | | | 705/304 |
| 2015/0358460 A1* | 12/2015 | Monegan | G06Q 30/016 |
| | | | 379/88.01 |
| 2016/0170584 A1* | 6/2016 | Kumar | G06F 3/013 |
| | | | 715/811 |
| 2016/0307210 A1* | 10/2016 | Agarwal | G06F 16/24578 |
| 2017/0133014 A1* | 5/2017 | Sharifi | G06F 16/433 |
| 2018/0063327 A1* | 3/2018 | Eisner | H04M 3/42221 |
| 2020/0019420 A1* | 1/2020 | Saimani | G06N 5/04 |

* cited by examiner

WIDGET METADATA

400(A)

| | C1 | C2 | C3 | C4 | C5 | C6 | C7 | C8 | C9 |
|---|---|---|---|---|---|---|---|---|---|
| | Widget Number | Segment | Query Type | Process Step | Outgoing Linked Widget 1 | Probability of Outgoing Linked Widget 1 | Outgoing Linked Widget 2 | Probability of Outgoing Linked Widget 2 | Location on Screen (X, Y) |
| R1 | | | | | | | | | |
| R2 | W1 | Deposit Rate | Rate of Interest | Deposit | W20 Deposit Documents | 0.72 | W4 Deposit Maturity | 0.25 | (20, 20) |
| R3 | W20 | Deposit Documents | Documentation | Deposit Completed | W39 Credit Card | 0.1 | W21 Nominee | 0.81 | (100, 70) |

FIG. 4A

REAL-TIME KNOWLEDGE-BASED WIDGET PRIORITIZATION AND DISPLAY

BACKGROUND

Aspects of the disclosure relate to deploying digital data processing systems to enable enterprise agents to provide fast, reliable, knowledge-based, and real-time information to serve customers of an enterprise organization. In particular, one or more aspects of the disclosure relate to real-time knowledge-based widget prioritization and display.

Enterprise organizations may utilize various enterprise agents to serve customers. Depending on a size and number of different business operations of an enterprise operation, a volume of customer queries may be large, and the queries may range over many different topics. Accordingly, enterprise agents may provide responses to such customer queries based on a large knowledge domain. Ensuring that responses to customer queries are properly identified in real-time, and timely and targeted responses are generated based on the knowledge domain, may be highly advantageous to provide an efficient real-time response computing infrastructure. In many instances, however, it may be difficult to respond to customer queries with speed and accuracy while also attempting to optimize network resources, bandwidth utilization, and efficient operations of the computing infrastructure.

SUMMARY

Aspects of the disclosure provide effective, efficient, scalable, fast, reliable, and convenient technical solutions that address and overcome the technical problems associated with real-time responses to customer queries.

In accordance with one or more embodiments, a computing platform having at least one processor, a communication interface, and memory may detect, via a computing device, a voice-based interaction between an enterprise agent and a customer. Then, the computing platform may cause, via the computing device, the voice-based interaction to be captured as audio data. The computing platform may then transform the audio data to textual data. Subsequently, the computing platform may identify, in the textual data, a customer query. Then, the computing platform may retrieve, in real-time and based on the voice-based interaction and from a repository of widgets, a first widget, where the first widget includes information at least partially responsive to the customer query. Then, the computing platform may display, to the enterprise agent and via a graphical user interface in use by the enterprise agent, the first widget.

In some embodiments, the computing platform may identify, in real-time and based on the voice-based interaction, a plurality of next widgets to be displayed via the graphical user interface. Then, the computing platform may upload, from the repository of widgets, the plurality of next widgets onto a local cache of a computing device associated with the graphical user interface.

In some embodiments, the computing platform may select, based on the voice-based interaction, a second widget of the plurality of next widgets. Then, the computing platform may display, via the graphical user interface, the second widget.

In some embodiments, the computing platform may update, in real-time and based on the voice-based interaction, the plurality of next widgets in the local cache.

In some embodiments, the computing platform may determine a priority score for one or more widgets in the repository of widgets, where the priority score for a particular widget of the one or more widgets is based at least in part on historical data indicative of a number of times a customer call has ended on the particular widget, a number of times the particular widget has been displayed at a prime location of an agent's graphical user interface, an amount of time the particular widget has been viewed by an agent, and a number of times the particular widget has been canceled by an agent.

In some embodiments, the computing platform may detect, via a pupil sensor associated with the graphical user interface, movement activity of at least one pupil of the enterprise agent. Then, the computing platform may determine, based on the movement activity, the priority score for the particular widget.

In some embodiments, the computing platform may update, in real-time and via a plurality of customer interactions with a plurality of agents, the priority score.

In some embodiments, the computing platform may cause, in real-time and based on the priority score, a self-arrangement of widgets being displayed via the graphical user interface.

In some embodiments, the computing platform may update, in real-time and based on the voice-based interaction, the priority score.

In some embodiments, the computing platform may detect, via the graphical user interface, an agent's rearrangement of the particular widget. Then, the computing platform may also update, based on the detecting, the priority score for the particular widget.

In some embodiments, the computing platform may analyze a knowledge domain available to the enterprise agent. Then, the computing platform may generate, based on the analyzing, a plurality of widgets, where each widget of the plurality of widgets includes an image text and a hyperlink.

In some embodiments, the computing platform may generate a node graph for the plurality of widgets, where a node of the node graph represents a widget, and where a directed path from a particular first widget to a particular second widget indicates that an agent viewing first information included in the particular first widget will likely view second information included in the particular second widget.

In some embodiments, the computing platform may retrieve the one or more widgets based on directed paths in the node graph.

In some embodiments, the computing platform may associate, based on historical data, the directed path with a probability score, where the probability score is indicative of a likelihood that an agent viewing the first information included in the particular first widget will view the second information included in the particular second widget.

In some embodiments, the computing platform may update, in real-time and via a plurality of customer interactions with a plurality of agents, the probability score.

In some embodiments, the computing platform may pre-populate, in real-time and based on the voice-based interaction, the one or more widgets with data related to the customer.

In some embodiments, the computing platform may determine, in real-time and based on the voice-based interaction, that the customer query may be resolved by a self-service resource. Then, the computing platform may create a self-service widget including information related to the self-service resource. Subsequently, the computing platform may display, to the enterprise agent and via the graphical user interface, the self-service widget.

In some embodiments, the computing platform may detect, a search query initiated by the enterprise agent. Then, the computing platform may create a widget responsive to the search query. Subsequently, the computing platform may display, to the enterprise agent and via the graphical user interface, the widget.

Implementations of the described techniques may include hardware, a method or process, or computer software on a computer-accessible medium.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 4A and 4B depict an illustrative widget metadata and a widget node graph for a real-time knowledge-based widget prioritization and display in accordance with one or more example embodiments.

DETAILED DESCRIPTION

Figure 1A:
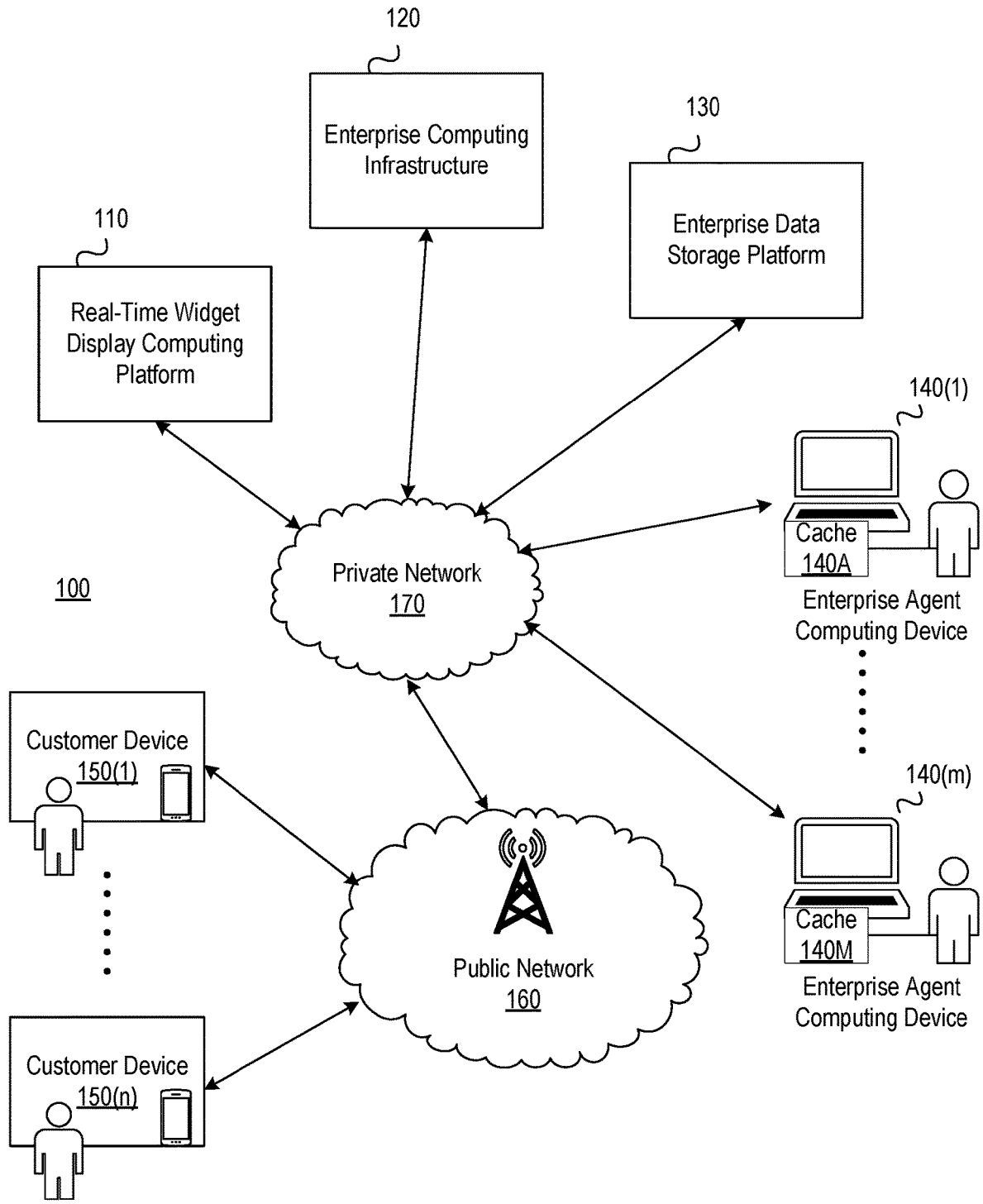
FIGS. 1A and 1B depict an illustrative computing environment for a real-time knowledge-based widget prioritization and display in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired, or wireless, and that the specification is not intended to be limiting in this respect.

Some aspects of the disclosure relate to a real-time knowledge-based widget prioritization and display. For example, enterprise organizations generally attempt to identify self-service features, such as customer calls that may be completed within an interactive voice response system, as this may reduce costs and simplify a customer service workflow process. As a customer interacts with the interactive voice response system, they may be connected to an enterprise agent. Typically, the enterprise agent may have to identify the customer's query, search an enterprise knowledge domain, and provide real-time responses to the customer. Depending on a size of the enterprise organization, the knowledge domain may be large, and the enterprise agent may spend a significant amount of time searching the knowledge domain, and/or retrieving relevant information. In some instances, the enterprise agent may lack an ability to properly query the knowledge domain.

Accordingly, aspects of this disclosure are directed to a graphical user interface that is configured to provide relevant information to an enterprise agent based on a real-time voice-based interaction with a customer. The knowledge domain may be configured into widgets that may be displayed via the graphical user interface. The widgets may be configured to be self-arranging based on a relative significance with respect to an ongoing voice-based interaction with the customer. Also, for example, recommended information may be pre-loaded and dynamically updated onto a local cache, thereby reducing latencies due to network transit and/or network traffic. Also, as described herein, widgets may be pre-loaded with customer specific information relevant to the ongoing voice-based interaction, thereby providing the enterprise agent with real-time access to relevant customer data, and enabling the enterprise agent to help the customer make better informed choices. In other aspects of this disclosure, in instances where the customer query may be resolved by a self-service feature, a prompt to the enterprise agent may be generated in real-time during the real-time voice-based interaction, thereby enabling faster resolution of customer calls, and achieving greater resolutions within the interactive voice response system.

Figure 1B:
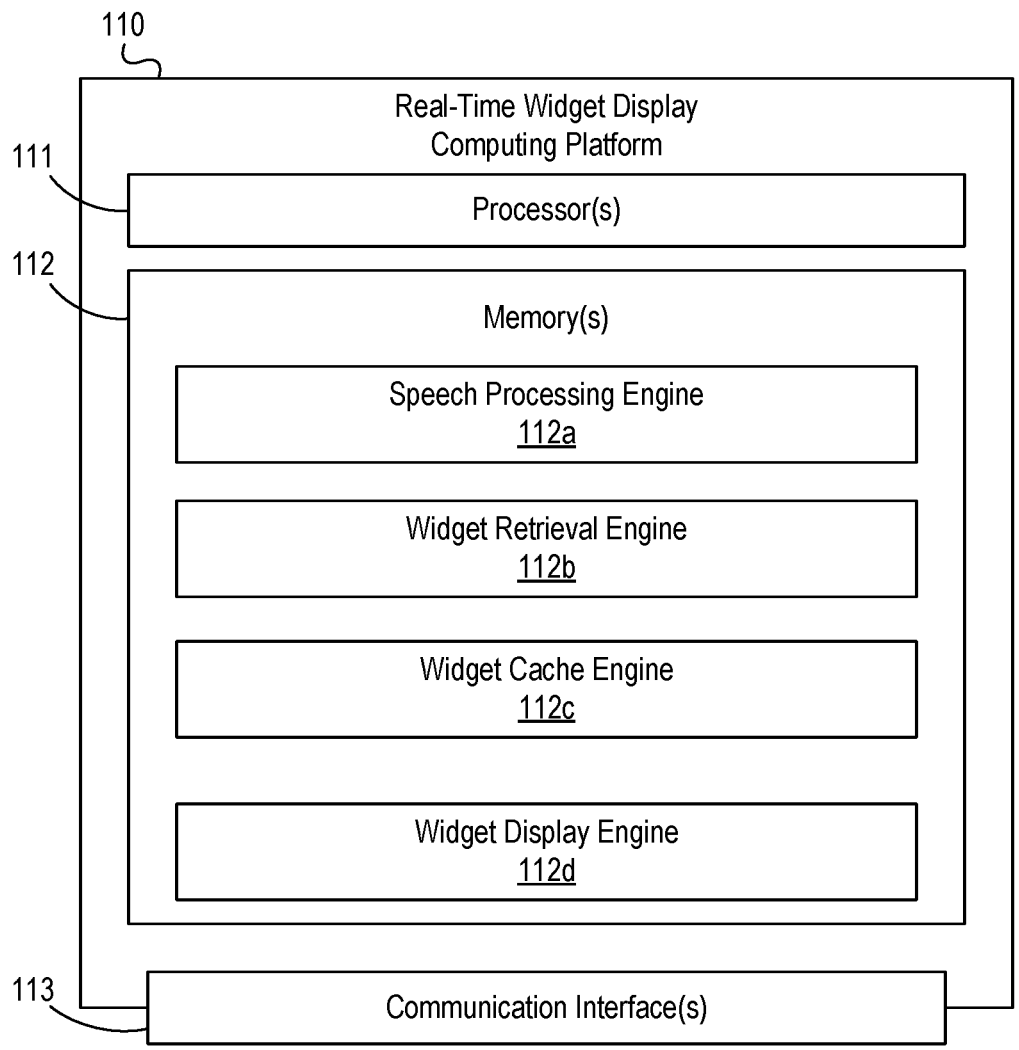

FIGS. 1A and 1B depict an illustrative computing environment for a real-time knowledge-based widget prioritization and display in accordance with one or more example embodiments. Referring to FIG. 1A, computing environment 100 may include one or more computer systems. For example, computing environment 100 may include real-time widget display computing platform 110, enterprise computing infrastructure 120, enterprise data storage platform 130, enterprise agent computing devices 140(1), . . . , 140(m), and customer devices 150(1), . . . , 150(n).

As illustrated in greater detail below, real-time widget display computing platform 110 may include one or more computing devices configured to perform one or more of the functions described herein. For example, real-time widget display computing platform 110 may include one or more computers (e.g., laptop computers, desktop computers, servers, server blades, or the like) and/or other computer components (e.g., processors, memories, communication interfaces).

Enterprise computing infrastructure 120 may include one or more computing devices and/or other computer components (e.g., processors, memories, communication interfaces). In addition, enterprise computing infrastructure 120 may be configured to host, execute, and/or otherwise provide one or more enterprise applications. For example, enterprise computing infrastructure 120 may be configured to host, execute, and/or otherwise provide a computing platform for call centers to provide interactive voice responses to customer queries. In some instances, enterprise computing infrastructure 120 may be configured to provide various enterprise and/or back-office computing functions for an enterprise organization, such as a financial institution. For example, enterprise computing infrastructure 120 may include various servers and/or databases that store and/or otherwise maintain account information, such as financial account information including account balances, transaction history, account owner information, and/or other information. Also, for example, enterprise computing infrastructure 120 may include various servers and/or databases that store and/or otherwise maintain a knowledge domain available to enterprise agents at the customer call centers. Additionally, or alternatively, enterprise computing infrastructure 120 may receive instructions from real-time widget display computing platform 110 and execute the instructions in a timely manner.

Enterprise data storage platform 130 may include one or more computing devices and/or other computer components (e.g., processors, memories, communication interfaces). In addition, and as illustrated in greater detail below, enterprise data storage platform 130 may be configured to store and/or otherwise maintain enterprise data. Additionally, or alternatively, enterprise computing infrastructure 120 may be configured to store and/or otherwise maintain data related to call center activity, a log of call, a log of types of issues addressed during the interactive voice responses, a log of information accessed by enterprise agents to provide responses to customers, data related to duration of a call, customer satisfaction, issue resolution, and so forth. Additionally, or alternatively, enterprise computing infrastructure 120 may load data from enterprise data storage platform 130, manipulate and/or otherwise process such data, and return modified data and/or other data to enterprise data storage platform 130 and/or to other computer systems included in computing environment 100.

Computing environment 100 also may include one or more networks, which may interconnect one or more of real-time widget display computing platform 110, enterprise computing infrastructure 120, enterprise data storage platform 130, enterprise agent computing devices 140(1), . . . , 140(m), and customer devices 150(1), . . . , 150(n). For example, computing environment 100 may include private network 170 (which may interconnect, for example, real-time widget display computing platform 110, enterprise computing infrastructure 120, and enterprise data storage platform 130, enterprise agent computing devices 140(1), . . . , 140(m), and/or one or more other systems which may be associated with an organization, such as a financial institution) and public network 160 (which may interconnect, for example, customer devices 150(1), . . . , 150(n) with private network 170 and/or one or more other systems, public networks, sub-networks, and/or the like). For example, public network 160 may interconnect customer devices 150(1), . . . , 150(n) with enterprise agent computing devices 140(1), . . . , 140(m) via private network 170. For example, a customer service provider interface at a customer call center may be configured such that a first interface allows participation by enterprise agent computing devices 140(1), . . . , 140(m) via private network 170, and a second interface allows participation by customer devices 150(1), . . . , 150(n) via public network 160. In some instances, public network 160 may be a high generation cellular network, such as, for example, a fifth generation ("5G") or higher cellular network. In some instances, private network 170 may likewise be a high generation cellular enterprise network, such as, for example, a 5G or higher cellular network.

In one or more arrangements, real-time widget display computing platform 110, enterprise computing infrastructure 120, enterprise data storage platform 130, enterprise agent computing devices 140(1), . . . , 140(m), and customer devices 150(1), . . . , 150(n), and/or the other systems included in computing environment 100 may be any type of computing device capable of communicating with a user interface, receiving input via the user interface, and communicating the received input to one or more other computing devices. For example, real-time widget display computing platform 110, enterprise computing infrastructure 120, enterprise data storage platform 130, enterprise agent computing devices 140(1), . . . , 140(m), and customer devices 150(1), . . . , 150(n), and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of real-time widget display computing platform 110, enterprise computing infrastructure 120, enterprise data storage platform 130, enterprise agent computing devices 140(1), . . . , 140(m), and customer devices 150(1), . . . , 150(n), may, in some instances, be special-purpose computing devices configured to perform specific functions.

Generally, for purposes herein, customer devices 150(1), . . . , 150(n) may be any device configured to make audio contact with the customer service provider interface. In some instances, customer devices 150(1), . . . , 150(n) may be a smart device capable of running an enterprise application. Likewise, for purposes herein, enterprise agent computing devices 140(1), . . . , 140(m) may be configured to include respective caches 140A, . . . , 140M. As described herein, caches 140A, . . . , 140M may be utilized to pre-load information expected to be shared via a customer service provider interface. For example, as a conversation proceeds, relevant information may be loaded onto caches 140A, . . . , 140M, so that enterprise agent computing devices 140(1), . . . , 140(m) are able to access this information in real-time. Providing the information via caches 140A, . . . , 140M reduces data retrieval time and/or data manipulation time by not needing to communicate over a network (e.g., private network 170) with a back-end database server (e.g., enterprise data storage platform 130), and/or one or more enterprise servers (e.g., enterprise computing infrastructure 120).

Referring to FIG. 1B, real-time widget display computing platform 110 may include one or more processors 111, memory 112, and communication interface 113. A data bus may interconnect processor 111, memory 112, and communication interface 113. Communication interface 113 may be a network interface configured to support communication between real-time widget display computing platform 110 and one or more networks (e.g., public network, private network, a local network, or the like). Memory 112 may include one or more program modules having instructions that when executed by processor 111 cause real-time widget display computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of real-time widget display computing platform 110 and/or by different computing devices that may form and/or otherwise make up real-time widget display computing platform 110.

For example, memory 112 may have, store, and/or include speech processing engine 112a, widget retrieval engine 112b, widget cache engine 112c, and widget display engine 112d. Speech processing engine 112a may have instructions that direct and/or cause real-time widget display computing platform 110 to detect, via a computing device, a voice-based interaction between an enterprise agent and a customer, as discussed in greater detail below. Speech processing engine 112a may also have instructions that direct and/or cause real-time widget display computing platform 110 to cause, via the computing device, the voice-based interaction to be captured as audio data. Speech processing engine 112a may also have instructions that direct and/or cause real-time widget display computing platform 110 to transform the audio data to textual data.

Widget retrieval engine 112b may have instructions that direct and/or cause real-time widget display computing platform 110 to retrieve, in real-time and based on the voice-based interaction and from a repository of widgets, a first widget, where the first widget includes information at least partially responsive to the customer query. Widget cache engine 112c may have instructions that direct and/or cause real-time widget display computing platform 110 to retrieve, in real-time and based on the voice-based interaction and from the repository of widgets, a plurality of widgets onto a local cache of a computing device associated with the graphical user interface. Widget cache engine 112c may have instructions that direct and/or cause real-time widget display computing platform 110 to prioritize, in real-time and based on the voice-based interaction, the plurality of widgets based on a priority. Widget display engine 112d may have instructions that direct and/or cause real-time widget display computing platform 110 to display, to the enterprise agent and via a graphical user interface in use by the enterprise agent, the first widget.

Figure 2A:
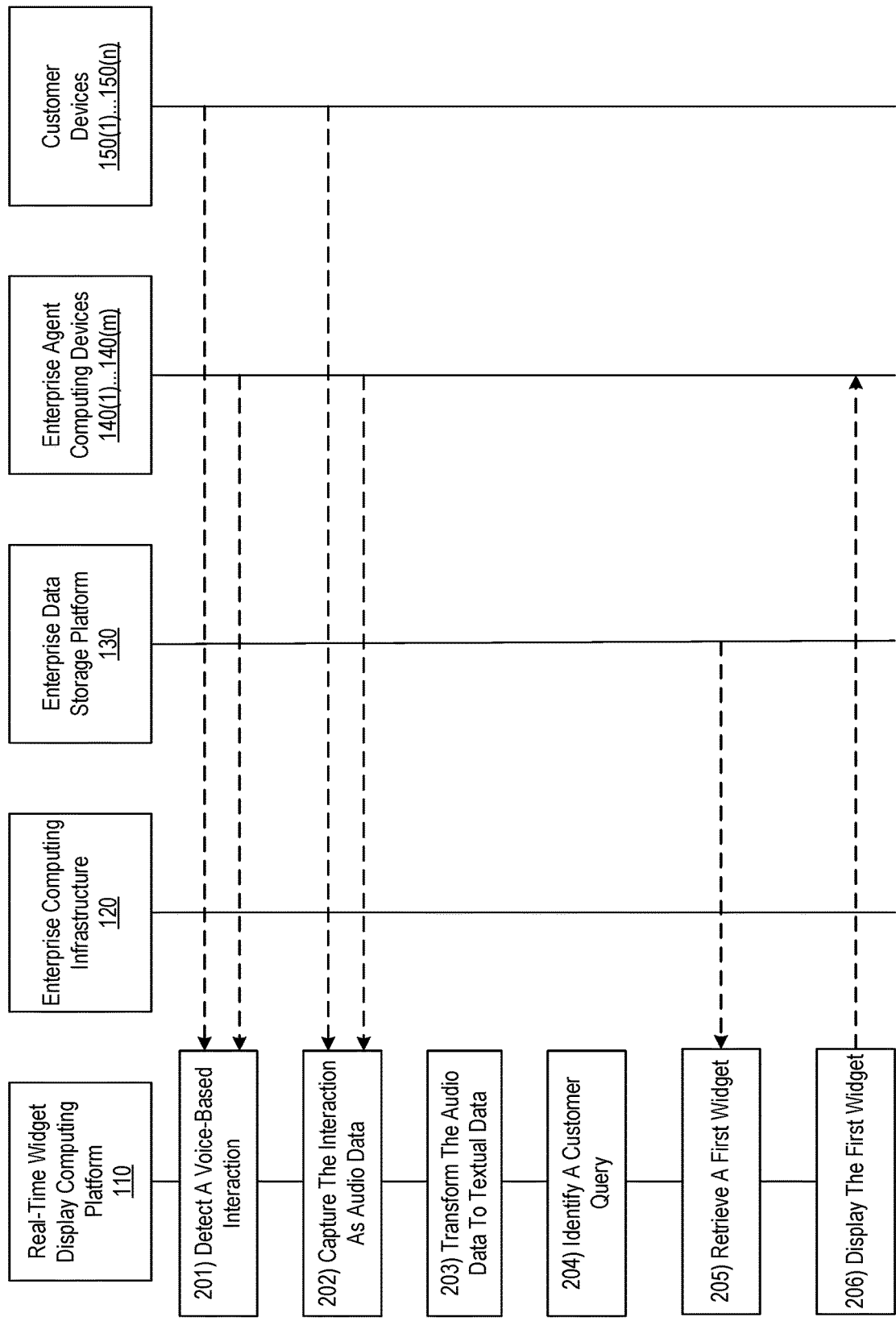
FIGS. 2A and 2B depict an illustrative event sequence for a real-time knowledge-based widget prioritization and display in accordance with one or more example embodiments.
Figure 2B:
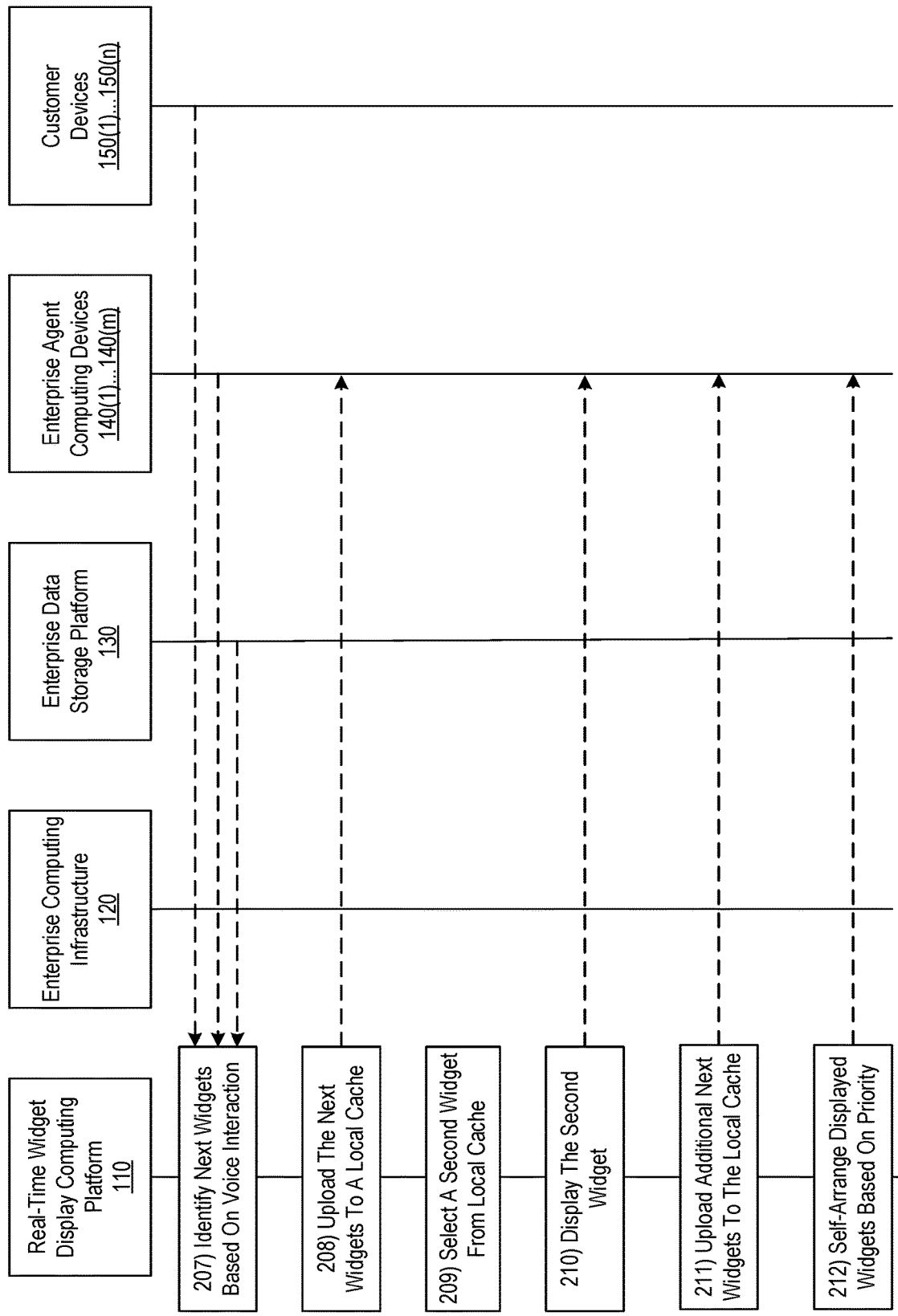

FIGS. 2A and 2B depict an illustrative event sequence for a real-time knowledge-based widget prioritization and display in accordance with one or more example embodiments. Referring to FIG. 2A, at step 201, real-time widget display computing platform 110 may detect, via a computing device, a voice-based interaction between an enterprise agent and a customer. For example, at step 201, real-time widget display computing platform 110 may detect an ongoing conversation between a customer and an enterprise agent via a customer service provider interface. For example, a customer may call an enterprise service center, and an interactive voice response system may route the call to an enterprise agent. In some embodiments, real-time widget display computing platform 110 may be triggered to detect voice interactions in such a call that is routed to an enterprise agent.

At step 202, real-time widget display computing platform 110 may cause, via the computing device, the voice-based interaction to be captured as audio data. In some embodiments, real-time widget display computing platform 110 may cause captured raw audio data to be stored as an audio data file. One or more audio file formats may be utilized, such as, for example, Waveform Audio File Format (WAV), Free Lossless Audio Codec (FLAC), and so forth. In some embodiments, the audio format may be a format that supports compression to be readily transmitted over a network. In some embodiments, the file format of the audio data file may be determined based on the configurations and/or processing abilities of a computing device (e.g., enterprise agent computing devices 140(1), . . . , 140(m)), and/or enterprise computing infrastructure 120.

At step 203, real-time widget display computing platform 110 may transform the audio data to textual data. For example, real-time widget display computing platform 110 may transcribe the audio data to textual data using a speech to text converter tool. The specific tool may be based on one or more factors such as, the language of the captured audio, length of the audio file, type of audio file, amount of background noise, and so forth. In some embodiments, real-time widget display computing platform 110 may transform the audio data to textual data in real-time. Higher speeds, low latency, and higher bandwidth of high generation cellular networks enable efficient and accurate real-time processing of the audio data.

At step 204, real-time widget display computing platform 110 may identify, in the textual data, a customer query. For example, real-time widget display computing platform 110 may access the enterprise server (e.g., enterprise computing infrastructure 120) to utilize natural language processing techniques to process and analyze natural language data in the textual data. One or more techniques such as topic and/or word segmentation, part-of-speech tagging, parsing, stemming, relationship extraction, entity relationships, word sense disambiguation, terminology extraction (e.g., based on a specific grammar), and so forth may be utilized to process the textual data. Also, for example, deep learning techniques may be utilized to process the textual data. In some embodiments, real-time widget display computing platform 110 may process one portion of the speech at step 203 to output a first portion of textual data, and real-time widget display computing platform 110 may then process, at step 204, the first portion of textual data, while simultaneously processing a second portion of the speech at step 203. Also, for example, the processing of the first portion of textual data at step 203 may inform processing of the second portion of the speech at step 204.

For example, real-time widget display computing platform 110 may identify keywords such as "interest rate", "deposit account", "mortgage", "withdraw", "credit", "trade", "portfolio", "nominee", and so forth. Also, for example, real-time widget display computing platform 110 may identify keywords such as "S&P index", "NYSE", "today", "CD", "savings", "direct deposit", "loan", "credit card", "balance", and so forth. Accordingly, real-time widget display computing platform 110 may be directed to one or more portions of the knowledge domain.

At step 205, real-time widget display computing platform 110 may retrieve, in real-time and based on the voice-based interaction and from a repository of widgets, a first widget, where the first widget includes information at least partially responsive to the customer query. As described herein, widgets may be generated from the knowledge domain, and the widgets may be stored in a repository (e.g., enterprise storage data platform 130). Based on the voice-based interaction, real-time widget display computing platform 110 may retrieve relevant widgets from the repository (e.g., enterprise storage data platform 130). For example, upon detecting a keyword "interest rate" real-time widget display computing platform 110 may retrieve a first widget with information related to "interest rate", and may also retrieve additional widgets related to the first widget.

In some embodiments, real-time widget display computing platform 110 may pre-populate, in real-time and based on the voice-based interaction, the first widget with data related to the customer. For example, a widget related to "interest rate" may be pre-populated with a current interest rate for customer's savings account. Also, for example, if the term "interest rate" is also detected in conjunction with the word "mortgage rate," then real-time widget display computing platform 110 may pre-populate a widget with personalized data related to the customer's current home mortgage loan. As another example, real-time widget display computing platform 110 may pre-populate a widget with eligibility criterion for the customer for a loan amount. Accordingly, the enterprise agent may access important and relevant customer data in real-time In some embodiments, real-time widget display computing platform 110 may analyze a knowledge domain available to the enterprise agent. As described herein, an enterprise database (e.g., enterprise storage data platform 130) may store a large amount of enterprise data related to services offered, customer accounts, customer data, financial information, trading information, and so forth. In particular, the knowledge domain may be a repository of information that an enterprise agent may share with a customer to resolve a customer query and/or complaint. Generally, an enterprise agent may search the knowledge domain in real-time during an interactive exchange with a customer. In some embodiments, real-time widget display computing platform 110 may analyze the knowledge domain and structure it into smaller modules of information. In some instances, a summary of each smaller module of information may then be represented by a widget.

In some embodiments, real-time widget display computing platform 110 may generate, based on the analyzing, a plurality of widgets, where each widget of the plurality of widgets comprises an image text and a hyperlink. A widget may be a summary of information included in a segment of the knowledge domain. For example, widgets may correspond to "deposit rate," "credit cards," "nominee," and so forth. Accordingly, the widget may include an image (e.g., a graphical representation of a stock price, symbols associated with financial entities, markets, exchanges, and so forth), text (including interest rates, news headlines, and so forth), and URLs (e.g., images and text may be hyperlinked via URLs to other web resources that may provide additional information).

Each widget may be associated with metadata that includes a widget number, such as, for example, W1, W20, W39, and so forth. The widget metadata may comprise information such as a segment, a query type, a process step, widget numbers of incoming and outgoing widget links, and associated probability scores. In some embodiments, the widget metadata may include a priority score associated with the widget. In some embodiments, widget metadata may include location coordinates indicating a position on a graphical user interface where a widget may be displayed.

In some embodiments, real-time widget display computing platform 110 may detect, a search query initiated by the enterprise agent. For example, an enterprise agent may, during a call, enter a search term to query the knowledge domain. Based on the search term, real-time widget display computing platform 110 may infer that, for example, the first widget provided to the enterprise agent may not suffice to respond to the customer query. Also, for example, real-time widget display computing platform 110 may infer that additional widgets displayed via the graphical user interface may not suffice to respond to the customer query. Real-time widget display computing platform 110 may create a widget responsive to the search query. In some embodiments, real-time widget display computing platform 110 may generate a widget in response to the enterprise agent's search query.

At step 206, real-time widget display computing platform 110 may display, to the enterprise agent and via a graphical user interface in use by the enterprise agent, the first widget. The first widget, and in some instances, additional widgets, maybe provided to the enterprise agent via a graphical user interface in use by the enterprise agent. The first widget may be displayed on the graphical user interface based on pixel coordinates included in metadata for the first widget.

In some embodiments, real-time widget display computing platform 110 may display, to the enterprise agent and via the graphical user interface, the widget responsive to the search query. As described, real-time widget display computing platform 110 may generate a widget in response to the enterprise agent's search query. Accordingly, real-time widget display computing platform 110 may display the generated widget to the enterprise agent via the graphical user interface.

Referring to FIG. 2B, at step 207, real-time widget display computing platform 110 may identify, in real-time and based on the voice-based interaction, a plurality of next widgets to be displayed via the graphical user interface. For example, based on the interactive customer service exchange and based on a widget node graph, real-time widget display computing platform 110 may identify a plurality of next widgets. The plurality of next widgets are recommended widgets that may be linked as outgoing widgets to the first widget. In some embodiments, the plurality of next widgets may be identified based on a probability score associated with the links to the outgoing widgets in a widget node graph.

In some embodiments, real-time widget display computing platform 110 may generate a node graph for the plurality of widgets, where a node of the node graph represents a widget, and where a directed path from a particular first widget to a particular second widget indicates that an agent viewing first information included in the particular first widget will likely view second information included in the particular second widget. For example, each node in the node graph may represent a widget, and a directed path from the first widget to the next widget may indicate a likelihood that the next widget is likely to be relevant to the enterprise agent after the first widget is utilized.

In some embodiments, real-time widget display computing platform 110 may associate, based on historical data, the directed path with a probability score, where the probability score is indicative of a likelihood that an agent viewing the first information included in the particular first widget will view the second information included in the particular second widget. For example, each directed path of the node graph may be associated with a probability score. As a directed path connects a first widget with a next widget, the directed path may be associated with a probability score that indicates a likelihood that the next widget may be utilized after the first widget.

In some embodiments, real-time widget display computing platform 110 may update, in real-time and via a plurality of customer interactions with a plurality of agents, the probability score. For example, at any given time, thousands of calls may be serviced by a plurality of enterprise agents. Accordingly, real-time widget display computing platform 110 may process a significant amount of data daily. Such data may be dynamically processed to generate standard queries, typical workflow of customer calls, typical sequences of widgets displayed and/or utilized, and so forth. Statistical models may be designed for such data, and such models may be used to update links in the node graph, and/or update probability scores associated with the links.

In some embodiments, real-time widget display computing platform 110 may retrieve the one or more widgets based on directed paths in the node graph. For example, the node graph may include a directed path via nodes, such as, for example, W1, W20, W21, W39. Accordingly, real-time widget display computing platform 110 may display widget W1 via the graphical user interface in use by the enterprise agent. Also, for example, real-time widget display computing platform 110 may display widgets W20, W21, and W39 via the graphical user interface in use by the enterprise agent.

At step 208, real-time widget display computing platform 110 may upload, from the repository of widgets, the plurality of next widgets onto a local cache of a computing device associated with the graphical user interface. For example, real-time widget display computing platform 110 may upload widgets W20, W21, and W39 onto a local cache associated with the graphical user interface. Subsequently, real-time widget display computing platform 110 may display widgets one or more of W20, W21, and W39 via the graphical user interface in use by the enterprise agent.

For example, various elements within a memory or other components of the computing device associated with the graphical user interface (e.g., enterprise agent computing devices 140(1), . . . , 140(m)), may include one or more caches (e.g., caches 140A, . . . , 140M), for example, CPU caches used by a processing unit of the computing device, page caches used by the operating system of the computing device, disk caches of a hard drive of the computing device, and/or database caches of the computing device used to cache content. For embodiments including a CPU cache, the CPU cache may be used by one or more processors to reduce memory latency and access time. In such examples, the processor may retrieve data from or write data to the CPU cache rather than reading/writing to the memory, which may improve the speed of these operations. In some examples, a database cache may be created in which widgets or other data from enterprise data storage platform 130 may cached in a separate smaller database on an application server local to the computing device. As described herein, caches 140A, . . . , 140M may reduce data retrieval time and/or data manipulation time by not needing to communicate over a network (e.g., private network 170) with a back-end database server (e.g., enterprise data storage platform 130), and/or one or more enterprise servers (e.g., enterprise computing infrastructure 120), thereby providing shorter response times to customer queries, and providing better responses in real-time. These types of caches and others may be included in various embodiments, and may provide potential advantages in certain implementations of search and retrieval of relevant information in real-time, and displaying such information for the enterprise agents.

At step 209, real-time widget display computing platform 110 may select, based on the voice-based interaction, a second widget of the plurality of next widgets. For example, as the voice-based interaction proceeds, real-time widget display computing platform 110 may identify additional customer queries, and may retrieve a second widget of the plurality of next widgets. For example, a customer query may begin with mortgage rates and move to loan documents. Accordingly, real-time widget display computing platform 110 may select the second widget to be related to mortgage loan documents.

At step 210, real-time widget display computing platform 110 may display, via the graphical user interface, the second widget. As described herein, real-time widget display computing platform 110 may display the second widget via the graphical user interface in use by the enterprise agent.

At step 211, real-time widget display computing platform 110 may update, in real-time and based on the voice-based interaction, the plurality of next widgets in the local cache. For example, as the voice-based interaction proceeds, real-time widget display computing platform 110 may identify additional customer queries, and may dynamically update the local cache. In some embodiments, as a call is completed, real-time widget display computing platform 110 may clear up the local cache.

In some embodiments, real-time widget display computing platform 110 may determine a priority score for one or more widgets in the repository of widgets, where the priority score for a particular widget of the one or more widgets is based at least in part on historical data indicative of a number of times a customer call has ended on the particular widget, a number of times the particular widget has been displayed at a prime location of an agent's graphical user interface, and a number of times the particular widget has been canceled by an agent.

For example, real-time widget display computing platform 110 may determine a priority score based on historical data indicative of a number of times a customer call has ended on a particular widget. Generally, when the enterprise agent ends a call on the particular widget, real-time widget display computing platform 110 may infer that the particular widget has high significance, and/or stores information particularly valuable to a content of the call. Accordingly, the particular widget may be associated with a higher priority score indicative of high relevance. For example, upon receiving an indication that a customer call has been completed, real-time widget display computing platform 110 may tag or otherwise mark the last widget utilized by the enterprise agent prior to the completion of the customer call. Generally, widgets may be tagged with a rank relative to their usage in a completion of a customer call. For example, the last widget to be used before the call competed may be associated with a rank of "1". Similarly, the second to last widget before the call competed may be associated with a rank of "2", and so on. Real-time widget display computing platform 110 may determine a priority score based on how many times a widget is ranked as "1" or "2" and so on. In some examples, the priority score may be a weighted average of such ranks.

Also, for example, real-time widget display computing platform 110 may determine a priority score based on historical data indicative of a number of times, and/or how long, the particular widget has been displayed at a prime location of an agent's graphical user interface. Generally, such data may be indicative of widgets that include information highly relevant to a customer, as well as a significant amount of information that may meet the need of a customer. In some embodiments, a top left corner of a display may be a preferred location for particularly significant widgets. Data from numerous interactions may be normalized to identify how many times the particular widget may have been displayed at a preferred location on the enterprise agent's graphical user interface. Real-time widget display computing platform 110 may determine a priority score based on such a count.

In some embodiments, real-time widget display computing platform 110 may detect, via a pupil sensor associated with the graphical user interface, movement activity of at least one pupil of the enterprise agent. For example, the pupil sensor may sense the movement activity to determine how much time an enterprise agent may spend viewing a particular widget, reading out the information included in the widget while viewing the particular widget, and/or visiting web resources via links included in the widget, reading content included at such web resources, and so forth. Also, for example, the pupil sensor may detect the widgets being viewed by the enterprise agent, and a sequence in which the widgets are viewed. Accordingly, based on pupil tracking techniques, a widget may be determined to be of a greater significance to an enterprise agent. Accordingly, based on the movement activity, the priority score associated with the widget may be determined, and/or updated, to be indicative of a higher priority and/or greater significance to the enterprise agent. Also, for example, if widgets are displayed in an order W1, W2, W3, and W4, and the enterprise agent views W1 and moves on to view W2, real-time widget display computing platform 110 may infer, based on the movement activity, that W3 is a next widget after W1, and that a priority score associated with W3 may be increased, so that W3 may have a higher priority score than W2. In some embodiments, real-time widget display computing platform 110 may cause the widgets to self-arrange based on the updated score. In some embodiments, real-time widget display computing platform 110 may update a node graph to link W1 to outgoing widget W3 with a higher probability.

In some embodiments, real-time widget display computing platform 110 may determine a priority score based on a number of times the particular widget has been canceled by an agent. For example, during an interactive customer service provider session, the enterprise agent may cancel a widget that is displayed on the graphical user interface. Accordingly, real-time widget display computing platform 110 may that the canceled widget has lesser relevance to the ongoing call. In some embodiments, real-time widget display computing platform 110 may infer that the canceled widget is of lower significance to the enterprise agent. Accordingly, the priority score associated with the widget may be indicative of such lower priority and/or lower significance to the enterprise agent.

In some embodiments, real-time widget display computing platform 110 may update, in real-time and based on the voice-based interaction, the priority score. For example, as described herein, the enterprise agent may interact with the widgets that are displayed on the graphical user interface. For example, the enterprise agent may rearrange the displayed widgets, cancel one or more of the widgets, spend varying amounts of time with different widgets, and so forth. Also, for example, as the voice-based interaction proceeds, real-time widget display computing platform 110 may update the customer queries, determine significance of a widget relative to the customer query. Accordingly, real-time widget display computing platform 110 may update the priority score based on the voice-based interaction.

In some embodiments, real-time widget display computing platform 110 may detect, via the graphical user interface, an agent's rearrangement of the particular widget, and update, based on the detecting, the priority score for the particular widget. In some embodiments, although widget metadata may indicate preferred pixel coordinates for the particular widget, in some instances, the enterprise agent may rearrange the displayed widgets, thereby providing real-time training data as to a significance associated with the displayed widget. Accordingly, real-time widget display computing platform 110 may detect such agent interaction with the graphical user interface, and may update, based on the detecting, the priority score for the particular widget. For example, the particular widget may have been displayed at a prime location, and the enterprise agent may have removed it from the prime location. Accordingly, real-time widget display computing platform 110 may decrease the priority score associated with the particular widget. As another example, the enterprise agent may have positioned the particular widget to a preferred location on the display. Accordingly, real-time widget display computing platform 110 may increase the priority score associated with the particular widget.

In some embodiments, real-time widget display computing platform 110 may update, in real-time and via a plurality of customer interactions with a plurality of agents, the priority score. For example, at any given time, thousands of calls may be serviced by a plurality of enterprise agents. Accordingly, real-time widget display computing platform 110 may process a significant amount of data. Such data may be dynamically processed to generate standard queries, typical workflow of customer calls, typical sequences of widgets displayed and/or utilized, typical interactions of enterprise agents with displayed widgets, typical movement activity of pupils of enterprise agents, and so forth. Statistical models may be designed for such data, and such models may be used to update the priority score.

At step 212, real-time widget display computing platform 110 may cause, in real-time and based on the priority score, a self-arrangement of widgets being displayed via the graphical user interface. For example, real-time widget display computing platform 110 may display widgets based on metadata indicative of a location based on pixel coordinates. Such a location may be, in turn, based on a priority score of the widget. As the priority score may be updated in real-time, the associated pixel coordinates in the widget metadata may be updated as well. Accordingly, real-time widget display computing platform 110 may cause a self-arrangement of the displayed widgets based on updated priority scores. As described herein, priority scores may be based on statistical models of distribution data for thousands of customer calls. Accordingly, the priority score may be dynamically updated, and real-time widget display computing platform 110 may cause a self-arrangement of the displayed widgets based on updated priority scores.

In some embodiments, real-time widget display computing platform 110 may determine, in real-time and based on the voice-based interaction, that the customer query may be resolved by a self-service resource. For example, voice-based interaction may indicate that a customer query may be resolved without a need for an enterprise agent. For example, the customer query may relate to a registration of a new credit card. Also, for example, a customer query may relate to retrieving a current account balance. In such instances, real-time widget display computing platform 110 may determine that the customer query may be resolved utilizing one or more self-service resources. In some embodiments, such self-service resources may be available via an enterprise mobile application, via a link to a web resource, and so forth.

Real-time widget display computing platform 110 may create a self-service widget comprising information related to the self-service resource. Based on a determination that the customer query may be resolved utilizing one or more self-service resources, real-time widget display computing platform 110 may create a self-service widget including information related to the self-service resource. For example, the widget may include a link to a web resource, a list of steps that may enable the customer to complete a task, a connection to an automated self-service resource, and so forth.

Subsequently, real-time widget display computing platform 110 may display, to the enterprise agent and via the graphical user interface, the self-service widget. For example, real-time widget display computing platform 110 may display the self-service widget, and prompt the enterprise agent to provide the contents of the self-service widget to the customer. In some embodiments, real-time widget display computing platform 110 may prompt the enterprise agent to provide a URL to a web resource, provide a telephone number associated with an automated self-service resource, connect the customer to an automated self-service resource, and so forth.

Figure 3:
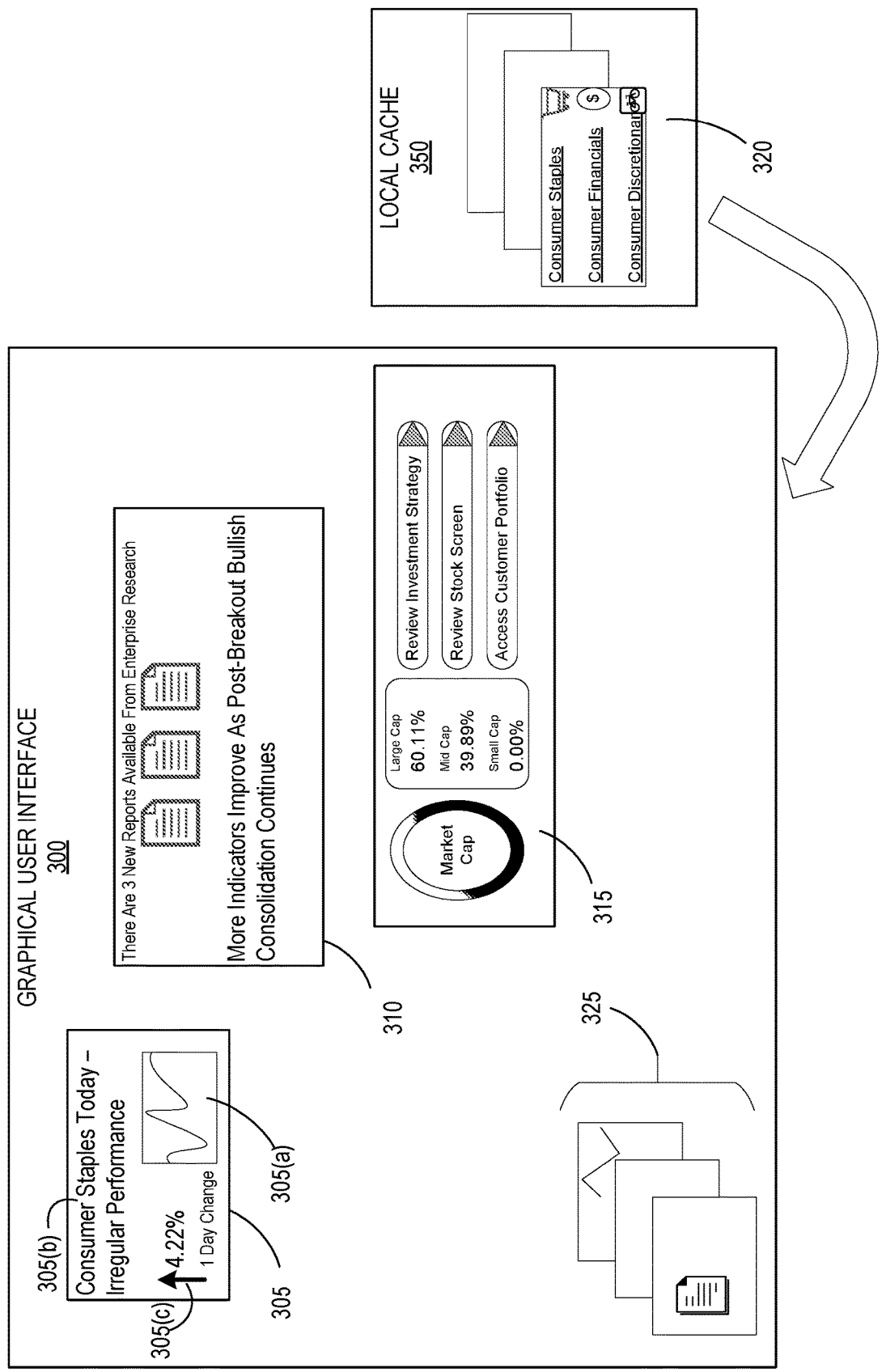
FIG. 3 depicts an illustrative graphical user interface for a real-time knowledge-based widget prioritization and display in accordance with one or more example embodiments.

FIG. 3 depicts an illustrative graphical user interface for a real-time knowledge-based widget prioritization and display in accordance with one or more example embodiments.

For illustrative purposes only, a widget is graphically represented by a rectangle. However, other shapes may be used in different embodiments. In some instances, a graphical user interface may include a plurality of widgets that are graphically represented by different geometric shapes. Referring to FIG. 3, a graphical user interface 300 is illustrated, along with an associated local cache 350. Graphical user interface 300 may display a plurality of widgets, such as for example, widget 305, widget 310, widget 315, and so forth. Each displayed widget may be a combination of an image, text, URL that may be displayed via graphical user interface 300.

For example, widget 305 may include an image of a graphical representation 305(a) of stock prices, an uptick arrow 305(c) illustrating a 1-day change of 4.22%, and other images. Also, for example, widget 305 may include text 305(b) such as, for example, "Consumer Staples Today—Irregular Performance." One or more objects included in widget 305 may be hyperlinked via a URL to another web resource, a data item in a database, and so forth. As another example, widget 310 may display text "There are 3 new reports available from enterprise research." Widget 310 may include hyperlinks to the three reports. Widget 310 may include additional text such as "More indicators improve a post-breakout bullish consolidation continues."

Also, for example, widget 315 may include an image representing a market cap, associated financial data including "Large Cap 60.11%, Mid Cap 39.89%, Small Cap 0.00%", and one or more links to additional information, such as, for example, "Review Investment Strategy", "Review Stock Screen", and "Access Customer Portfolio."

In some embodiments, widget 305, widget 310, and widget 315, may be linked in a widget node graph. In some embodiments, widget 305 may have an outgoing link to widget 310, and widget 310 may have an outgoing links to widget 315. In some embodiments, widget 305 may have outgoing links to widget 310 and widget 315, with a higher probability score associated with the link to widget 310.

One or more outgoing widgets 325 may be outgoing widgets that have been utilized by the enterprise agent prior to utilizing widget 305. In some embodiments, the one or more outgoing widgets 325 may include widgets that were provided to the enterprise agent but were not utilized. As an example, widget 305 may be moved to the collection of outgoing widgets 325 after widget 305 has been fully utilized. However, in some instances, while utilizing widget 305, the enterprise agent may determine that widget 310 is not relevant to the ongoing customer interaction, and may manually move widget 310.

Graphical user interface 300 may be communicatively linked to a local cache 350. As described herein, local cache 350 may store one or more next widgets 320 that may be displayed via graphical user interface 300. In some embodiments, the one or more next widgets 320 may be retrieved from an enterprise database (e.g., enterprise data storage platform 130) based on a real-time customer service provider exchange between an enterprise agent and a customer. In some implementations, local cache 350 may be dynamically updated in real-time based on an ongoing customer service provider exchange. Also, for example, at least a sub-collection of the one or more next widgets 320 may be displayed via graphical user interface 300.

Figure 4B:
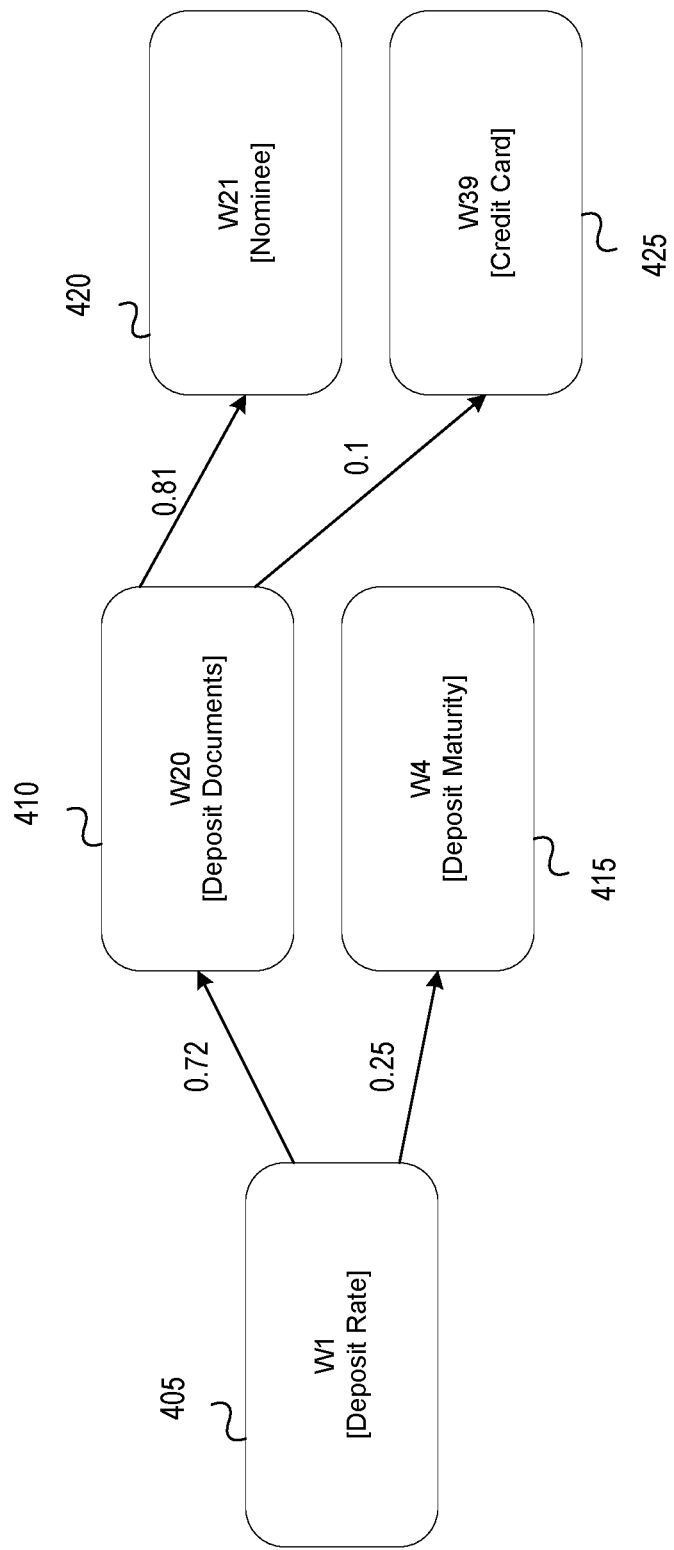

FIGS. 4A and 4B depict an illustrative widget metadata and a widget node graph for a real-time knowledge-based widget prioritization and display in accordance with one or more example embodiments. Referring to FIG. 4A, example widget metadata 400(A) is illustrated. During an interactive customer service provider exchanges, an enterprise agent may have to respond to customer queries in real-time. Generally, the enterprise agent may search an enterprise knowledge domain for appropriate responses to the customer queries. However, such a process may be time-consuming, due to latencies related to querying the knowledge domain, communicating with a central server, and so forth. Also, for example, such a process may not result in providing responses that are relevant to resolving a customer issue. Also, given that thousands of enterprise agents may be simultaneously responding to thousands of customers, small errors may become scalable to larger issues. Accordingly, significant efficiencies may be achieved by structuring the enterprise knowledge domain.

In some embodiments, the enterprise knowledge domain may be structured into segments, query types, process steps, and so forth. Accordingly, the enterprise knowledge domain may be structured to generate widgets that include relevant information such as a segment, a query type, and a process step. The knowledge domain may be classified into broad concepts, or segments. For example, "deposit rates" may be a segment of the knowledge domain that includes information related to deposit rates. This may include information related to, for example, current deposit rates, changes, trends, analysis, customer data for rates related to customer deposits, and so forth.

As another example, "deposit documents" may be a segment of the knowledge domain that includes information related to various deposit documents. This may include information related to, for example, documents required to open, maintain, renew, and close a deposit account. As another example, "deposit maturity" may be a segment of the knowledge domain that includes information related to maturity of a deposit. For example, when a deposit matures, there may be information related to a renewal, rates for a renewal, how much interest is accrued, how the accrued interest is paid, and so forth. As another example, "nominee" may be a segment of the knowledge domain that includes information related to nominees. For example, such information may be related to adding, removing, or otherwise changing a nominee, and/or other restrictions to appoint a nominee, a percentage of allocation for a nominee, and so forth. Also, for example, "credit card" may be a segment of the knowledge domain that includes information related to credit cards. For example, types of credit cards available, potential credit limits, cashback related information, and so forth. As described, the segments may include overlapping information.

In some embodiments, a query type may be a portion of a segment that a customer query may relate to. For example, the segment may be "deposit rate," and the query type may be a "rate of interest." Accordingly, information and data related to rates of interest may be provided in response to a customer query. Similarly, a process step may be a task associated with the query type. For example, for a query type "rate of interest" in a segment "deposit rate," a process step may be "deposit." For example, a customer may use an interactive customer service provider session, and a context of the interaction may relate to a query about deposit rates, and in particular, a query about a current rate of interest. Accordingly, it may be inferred that a customer may initiate a deposit into an account, and the process step may be "deposit."

Generally, a progression from "segment" to "query type," to "process type" may be a progression from a general concept, to a more focused concept within the general concept, to a task step related to the focused concept, respectively. Each widget may comprise a segment, a query type, and a process step.

Referring to FIG. 4A, widget metadata 410(A) is illustrated in tabular form. Widget metadata 410(A) is general metadata associated with various widgets that are representative of portions of the knowledge domain. Real-time widget display computing platform 110 may retrieve widgets based on widget metadata, as depicted in widget metadata 410(A). A widget "W1" is illustrated in row R2, column C1. Widget W1 may include a segment "Deposit Rate" (as shown in row R2, column C2), a query type "Rate of Interest" (as shown in row R2, column C3), and a process step "Deposit" (as shown in row R2, column C4). As indicated in row R2, column C5, widget W1 may be linked to a first widget W20. A probability that widget W20 may be a next widget after widget W1 may be 0.72, as indicated in row R2, column C6. As indicated in row R2, column C7, widget W1 may also be a linked to a second widget, widget W4, and a probability that widget W4 may be a next widget after widget W1 may be 0.25, as indicated in row R2, column C8. As 0.72 is greater than 0.25, there is a higher likelihood that widget W20 may be provided as a next widget after widget W1, than widget W4 being provided as a next widget after widget W1. As indicated in row R2, column C9, widget W1 may be associated with a location on a graphical user interface, such as for example, a pixel location of "(20, 20)." Accordingly, when widget W1 is provided to the graphical user interface, its graphical representation may be rectangular, and a top left corner of such rectangle may be configured to have pixel coordinates (20, 20).

As another example, widget W20 (shown in row R3, column C1) may include a segment "Deposit Documents" (as shown in row R3, column C2), a query type "Documentation" (as shown in row R3, column C3), and a process step "Deposit Completed" (as shown in row R3, column C4). As indicated in row R3, column C5, widget W20 may be linked to a first widget W39 with a segment "Credit Card." A probability that widget W39 may be a next widget after widget W20 may be 0.1, as indicated in row R3, column C6. As indicated in row R3, column C7, widget W20 may also be a linked to a second widget, widget W21 with a segment "Nominee", and a probability that widget W21 may be a next widget after widget W20 may be 0.81, as indicated in row R3, column C8. As 0.81 is greater than 0.1, there is a higher likelihood that widget W21 may be provided as a next widget after widget W20, than widget W39 being provided as a next widget after widget W20. As indicated in row R3, column C9, widget W20 may be associated with a location on a graphical user interface, such as for example, a pixel location of "(100, 70)." Accordingly, when widget W20 is provided to the graphical user interface, its graphical representation may be rectangular, and a top left corner of such rectangle may be configured to have pixel coordinates (100, 70).

Referring to FIG. 4B, an example widget node graph 400(B) is illustrated. Generally, a node graph may represent a recommended workflow process as a customer call progresses in real-time. Each node of the node graph represents a widget, while each edge of the node graph is a directed edge that links a particular widget to a recommended next widget. Each edge may be associated with a probability score indicative of a likelihood that an enterprise agent viewing the first information included in the particular widget will view the second information included in the recommended next widget.

As depicted, a widget W1 406 with a segment "Deposit Rate" may be linked to a first widget W20 410, associated with a segment "Deposit Documents", and a second widget W4 415, associated with a segment "Deposit Maturity". A directed path from widget W1 406 to widget W20 410 may be associated with a probability score of 0.72. An enterprise agent viewing information included in widget W1 405 be likely to view the information included in widget W20 410 with a probability of 0.72. A directed path from widget W1 406 to widget W4 415 may be associated with a probability score of 0.25. An enterprise agent viewing information included in widget W1 406 be likely to view the information included in widget W4 415 with a probability of 0.25.

As another example, widget W20 410 with a segment "Deposit Documents" may be linked to a third widget W22 420, associated with a segment "Nominee", and a fourth widget W39 425, associated with a segment "Credit Card". A directed path from widget W20 410 to widget W22 420 may be associated with a probability score of 0.81. An enterprise agent viewing information included in widget W20 410 be likely to view the information included in widget W22 420 with a probability of 0.81. A directed path from widget W20 410 to widget W39 425 may be associated with a probability score of 0.1. An enterprise agent viewing information included in widget W20 410 be likely to view the information included in widget W39 425 with a probability of 0.1.

As described, when an agent is interacting with a customer in real-time, widget W1 405 may be provided to the enterprise agent via a graphical user interface. In some embodiments, based on the voice interaction, and based on a probability score of 0.72, widget W20 410 may be loaded onto a local cache as a next recommended widget. As the voice interaction proceeds, the enterprise agent may complete utilizing the information in widget W1 405, and the next recommended widget W20 410 may be provided to the enterprise agent via the graphical user interface. Accordingly, the enterprise agent may proceed from discussing deposit rate related information in widget W1 405 to review and/or provide deposit documents, information related to such documents are made available to the enterprise agent in widget W20 410.

In some embodiments, based on the voice interaction, and based on a probability score of 0.81, widget W21 420 may be loaded onto a local cache as a next recommended widget after widget W20 410 is provided. In some embodiments, widget W21 420 nay be provided to the enterprise agent via the graphical user interface at the same time widget W20 410 is provided. In some embodiments, real-time widget display computing platform 110 may cause, in real-time and based on a priority score, a self-arrangement of widgets W1 405, W20 410, and W21 420, being displayed via the graphical user interface. As the voice interaction proceeds, the enterprise agent may complete utilizing the information in widget W20 410, and the next recommended widget W21 420 may be provided to the enterprise agent via the graphical user interface. Accordingly, the enterprise agent may proceed from discussing information related to deposit documents in widget W20 410, to review and/or provide nominee related information as is made available to the enterprise agent in widget W21 420.

As described herein, widget graph 400(B) is depicted as a forward graph with one node leading to the next via a link. During a real-time customer call, the forward graph is a directed graph representative of future recommendations and/or next widgets. However, in some instances, to perform suitable analytics, and/or to train a machine learning model, it may be useful to consider a backward graph that traces back in time. For example, widget W20 410 may be considered to have an incoming link from widget W1 405, where the probability associated with the incoming link is 0.72. Similarly, although not depicted in FIG. 4B, widget W1 405 may have an incoming linked widget W0, where the incoming link may be associated with a probability of 0.9. Generally, probabilities associated with incoming and outgoing links may not be the same for a pair of widgets.

As illustrated, a plurality of widgets may be generated based on the knowledge domain. The widgets may be linked to one another in a widget node graph. In some embodiments, different portions of a knowledge domain may be associated with different node graphs. Also, for example, new widgets may be generated based on interactive voice responses. In some embodiments, information displayed on widgets may be updated in real-time.

Generally, how many widgets may be displayed via the graphical user interface, and/or how many widgets may be loaded onto the local cache, may depend on a type of widget (e.g., a segment associated with the widget), a type of customer, a customer query, a duration of a call, the enterprise agent, and so forth. For example, a customer query may relate to a current mortgage rate. In such instances, fewer widgets may be needed. On the other hand, a customer query may relate to a savings account, a mortgage account, a trading account, and so forth, and multiple different widgets may be needed. Also, for example, as a call duration may increase, real-time widget display computing platform 110 may infer that customer is not getting a correct information, and may make several different widgets available to the enterprise agent so that customer's specific query may be quickly identified and resolved. Also, for example, some enterprise agents that are more experienced may be provided fewer widgets as such enterprise agents are able to quickly respond to the customer queries, and/or navigate the knowledge domain to identify resolutions to customer queries.

Figure 5:
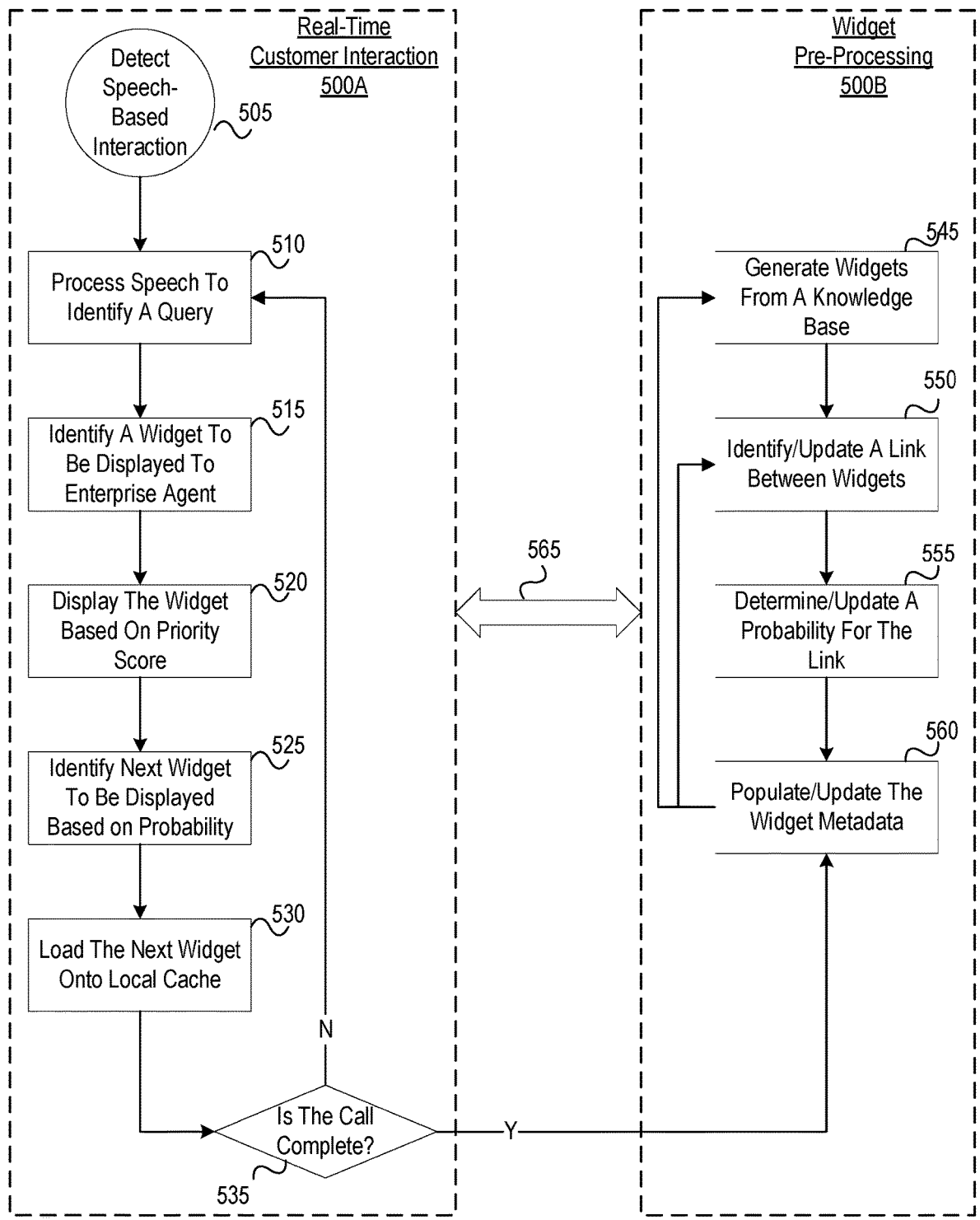
FIG. 5 depicts an illustrative method for a real-time knowledge-based widget prioritization and display in accordance with one or more example embodiments.

FIG. 5 depicts an illustrative method for a real-time knowledge-based widget prioritization and display in accordance with one or more example embodiments. Referring to FIG. 5, at step 505, a computing platform having at least one processor, a communication interface, and memory may detect, via an interactive customer service provider interface, a speech-based interaction. At step 510, the computing platform may, upon detecting the speech-based interaction, process the speech-based interaction to identify a query. For example, the computing platform may cause the voice-based interaction to be captured as audio data. Also, for example, the computing platform may transform the audio data to textual data and identify a customer query in the textual data.

At step 515, the computing platform may identify a widget to be displayed to an enterprise agent participating in the interactive voice response. For example, the computing platform may retrieve, in real-time and based on the voice-based interaction and from a repository of widgets, a first widget, where the first widget includes information at least partially responsive to the customer query. At step 520, the computing platform may display the widget to the enterprise agent via a graphical user interface. At step 525, the computing platform may identify a next widget to be displayed, where the next widget is identified based on a probability. At step 530, the computing platform may load the next widget onto a local cache, such as a cache accessible to the graphical user interface.

At step 535, the computing platform may determine if the interactive voice exchange is complete. If at step 535, the computing platform determines that the interactive voice exchange is not complete, the process may return to step 510. If at step 535, the computing platform determines that the interactive voice exchange is complete, the process may proceed to step 560. At step 560, widget metadata may be populated and/or updated based on an enterprise agent's interaction with the displayed widgets. In some embodiments, the process may proceed to step 550 to update a link between widgets in a widget node graph, and to step 555 to update a probability score for the link. In some embodiments, the process may proceed from step 560 to step 545 to generate new widgets based on the interactive voice exchange session with the customer.

In some embodiments, widget pre-processing 500B may continue in a background as information is uploaded and/or updated in the knowledge domain. For example, at step 545, the computing platform may generate widgets from a knowledge domain. At step 550, the computing platform may identify a link between widgets. At step 555, the computing platform may determine a probability score for the identified link. At step 560, the computing platform may populate the widget metadata.

Generally, as illustrated, steps 505 to 535 may be performed in a customer-facing setting during real-time customer interaction 500A, whereas steps 545 to 560 may be performed as part of a background widget pre-processing 500B. As indicated by bi-directional arrow 565, steps performed as part of real-time customer interaction 500A may be interactive with steps performed as part of widget pre-processing 500B. For example, based on real-time customer interaction 500A, widgets may be generated at step 545, a link between widgets may be updated at step 550, a probability score associated with the link may be updated at step 555, and/or widget metadata may be populated and/or updated at step 560. Also, for example, based on widget pre-processing 500B, a widget may be identified at step 515, displayed widgets may be self-arranged at step 520 based on a priority score, next widgets may be identified at step 525 based on an updated probability score, and so forth.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular time-sensitive tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to implement one or more aspects of the disclosure more effectively, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a graphical user interface;
   a communication interface communicatively coupled to the at least one processor; and
   memory storing computer-readable instructions that, when executed by the at least one processor, cause the computing platform to:
   detect, via a computing device, a voice-based interaction between an enterprise agent and a customer;
   cause, via the computing device, the voice-based interaction to be captured as audio data;
   transform the audio data to textual data;
   identify, in the textual data, a customer query;
   retrieve, in real-time and based on the voice-based interaction and from a repository of widgets, a first widget, wherein the first widget enables interaction by the enterprise agent with the graphical user interface via the first widget and comprises information at least partially responsive to the customer query; and
   display, to the enterprise agent and via the graphical user interface, the first widget.

2. The computing platform of claim 1, wherein the memory stores additional computer-readable instructions that, when executed by the at least one processor, cause the computing platform to:
   identify, in real-time and based on the voice-based interaction, a plurality of next widgets to be displayed via the graphical user interface; and
   upload, from the repository of widgets, the plurality of next widgets onto a local cache of a computing device associated with the graphical user interface.

3. The computing platform of claim 2, wherein the memory stores additional computer-readable instructions that, when executed by the at least one processor, cause the computing platform to:
   select, based on the voice-based interaction, a second widget of the plurality of next widgets; and
   display, via the graphical user interface, the second widget.

4. The computing platform of claim 2, wherein the instructions to upload the plurality of next widgets onto the local cache comprise additional computer-readable instructions that, when executed by the at least one processor, cause the computing platform to:
   update, in real-time and based on the voice-based interaction, the plurality of next widgets in the local cache.

5. The computing platform of claim 1, wherein the memory stores additional computer-readable instructions that, when executed by the at least one processor, cause the computing platform to:
   determine a priority score for one or more widgets in the repository of widgets, wherein the priority score for a particular widget of the one or more widgets is based at least in part on historical data indicative of a number of times a customer call has ended on the particular widget, a number of times the particular widget has been displayed at a prime location of an agent's graphical user interface, and a number of times the particular widget has been canceled by an agent.

6. The computing platform of claim 5, wherein the memory stores additional computer-readable instructions that, when executed by the at least one processor, cause the computing platform to:
   detect, via a pupil sensor associated with the graphical user interface, movement activity of at least one pupil of the enterprise agent;
   determine, based on the movement activity, the priority score for the particular widget.

7. The computing platform of claim 5, wherein the memory stores additional computer-readable instructions that, when executed by the at least one processor, cause the computing platform to:
   update, in real-time and via a plurality of customer interactions with a plurality of agents, the priority score.

8. The computing platform of claim 5, wherein the memory stores additional computer-readable instructions that, when executed by the at least one processor, cause the computing platform to:
   self-arrange, in real-time and based on the priority score, widgets being displayed via the graphical user interface.

9. The computing platform of claim 5, wherein the memory stores additional computer-readable instructions that, when executed by the at least one processor, cause the computing platform to:
   update, in real-time and based on the voice-based interaction, the priority score.

10. The computing platform of claim 5, wherein the memory stores additional computer-readable instructions that, when executed by the at least one processor, cause the computing platform to:
   detect, via the graphical user interface, an agent's rearrangement of the particular widget; and
   update, based on the detecting, the priority score for the particular widget.

11. The computing platform of claim 5, wherein the memory stores additional computer-readable instructions that, when executed by the at least one processor, cause the computing platform to:
   tag each widget in a ranked order that each said widget is used before completion of the voice-based interaction; and
   determine the priority score for each said widget from a weighted average of the ranked order.

12. The computing platform of claim 1, wherein the memory stores additional computer-readable instructions that, when executed by the at least one processor, cause the computing platform to:
   analyze a knowledge domain available to the enterprise agent; and
   generate, based on the analyzing, a plurality of widgets, wherein each widget of the plurality of widgets comprises an image text and a hyperlink.

13. The computing platform of claim 12, wherein the memory stores additional computer-readable instructions that, when executed by the at least one processor, cause the computing platform to:
   generate a node graph for the plurality of widgets, wherein a node of the node graph represents a widget, and wherein a directed path from a particular first widget to a particular second widget indicates that an agent viewing first information included in the particular first widget will likely view second information included in the particular second widget.

14. The computing platform of claim 13, wherein the instructions to retrieve the one or more widgets comprise additional computer-readable instructions that, when executed by the at least one processor, cause the computing platform to:
   retrieve the one or more widgets based on directed paths in the node graph.

15. The computing platform of claim 13, wherein the memory stores additional computer-readable instructions that, when executed by the at least one processor, cause the computing platform to:
   associate, based on historical data, the directed path with a probability score, wherein the probability score is indicative of a likelihood that an agent viewing the first information included in the particular first widget will view the second information included in the particular second widget.

16. The computing platform of claim 15, wherein the memory stores additional computer-readable instructions that, when executed by the at least one processor, cause the computing platform to:
   update, in real-time and via a plurality of customer interactions with a plurality of agents, the probability score.

17. The computing platform of claim 15, wherein the node graph comprises first, second, and third nodes, wherein the first node corresponds to the particular first widget, the second node corresponds to the particular second widget, and the third node corresponds to a particular third widget and wherein the memory stores additional computer-readable instructions that, when executed by the at least one processor, cause the computing platform to:
   assign a first probability to a first directed path from the first node to the second node, wherein the first probability is indicative that the enterprise agent will utilize the particular second widget; and
   assign a second probability to a second directed path from the first node to the third node, wherein the second probability is indicative that the enterprise agent will utilize the particular third widget, wherein the first and second probabilities are non-zero.

18. The computing platform of claim 1, wherein the memory stores additional computer-readable instructions that, when executed by the at least one processor, cause the computing platform to:
   pre-populate, in real-time and based on the voice-based interaction, the first widget with data related to the customer.

19. The computing platform of claim 1, wherein the memory stores additional computer-readable instructions that, when executed by the at least one processor, cause the computing platform to:
   determine, in real-time and based on the voice-based interaction, that the customer query may be resolved by a self-service resource;
   create a self-service widget comprising information related to the self-service resource; and
   display, to the enterprise agent and via the graphical user interface, the self-service widget.

20. The computing platform of claim 1, wherein the memory stores additional computer-readable instructions that, when executed by the at least one processor, cause the computing platform to:
   detect, a search query initiated by the enterprise agent;
   create a widget responsive to the search query; and
   display, to the enterprise agent and via the graphical user interface, the widget.

21. A method, comprising:
   at a computing platform comprising at least one processor, a communication interface, and memory:
      detecting, via a computing device, a voice-based interaction between an enterprise agent and a customer;
      causing, via the computing device, the voice-based interaction to be captured as audio data;
      transforming the audio data to textual data;
      identifying, in the textual data, a customer query;
      retrieving, in real-time and based on the voice-based interaction and from a local cache, a first widget, wherein the first widget enables interaction by the enterprise agent with a graphical user interface via the first widget and comprises information at least partially responsive to the customer query; and
      displaying, to the enterprise agent and via the graphical user interface in use by the enterprise agent, the first widget.

22. The method of claim 21 further comprising:
   determining a priority score for one or more widgets in a repository of widgets, wherein the priority score for a particular widget of the one or more widgets is based at least in part on historical data indicative of a number of times a customer call has ended on the particular widget, a number of times the particular widget has been displayed at a prime location of an agent's graphical user interface, and a number of times the particular widget has been canceled by an agent;

tagging each widget in a ranked order that each said widget is used before completion of the voice-based interaction; and determining the priority score for each said widget from a weighted average of the ranked order.

23. The method of claim 21 further comprising:

analyzing a knowledge domain available to the enterprise agent;

generating, based on the analyzing, a plurality of widgets, wherein each widget of the plurality of widgets comprises an image text and a hyperlink;

generating a node graph for the plurality of widgets, wherein a node of the node graph represents a widget, and wherein a directed path from the first widget to a second widget indicates that an agent viewing first information included in the first widget will likely view second information included in the second widget, wherein the node graph comprises first, second, and third nodes, wherein the first node corresponds to the first widget, the second node corresponds to the second widget, and the third node corresponds to a third widget;

associating, based on historical data, the directed path with a probability score, wherein the probability score is indicative of a likelihood that an agent viewing the first information included in the first widget will view the second information included in the second widget;

assigning a first probability to a first directed path from the first node to the second node, wherein the first probability is indicative that the enterprise agent will utilize the second widget; and assigning a second probability to a second directed path from the first node to the third node, wherein the second probability is indicative that the enterprise agent will utilize the third widget, wherein the first and second probabilities are non-zero.

24. One or more non-transitory computer-readable media storing instructions that, when executed by a computing platform comprising at least one processor, a communication interface, and memory, cause the computing platform to:

detect, via a computing device, a voice-based interaction between an enterprise agent and a customer;

cause, via the computing device, the voice-based interaction to be captured as audio data;

transform the audio data to textual data;

identify, in the textual data, a customer query;

retrieve, in real-time and based on the voice-based interaction and from a repository of widgets, a plurality of widgets, wherein the plurality of widgets enables interaction by the enterprise agent with a graphical user interface via a first widget and comprises information at least partially responsive to the customer query;

display, to the enterprise agent and via the graphical user interface in use by the enterprise agent, the plurality of widgets;

cause, in real-time and based on a priority score, a self-arrangement of widgets being displayed via the graphical user interface;

identify, in real-time and based on a node graph, a next widget to be displayed via the graphical user interface, wherein the next widget is reachable from the first widget via a directed path in the node graph;

upload, from the repository of widgets, the next widget onto a local cache of a computing device associated with the graphical user interface; and display, via the graphical user interface, the next widget.

25. The one or more non-transitory computer-readable media of claim 24 that, when executed by the computing platform, cause the computing platform to:

tag each widget in a ranked order that each said widget is used before completion of the voice-based interaction; and determine the priority score for each said widget from a weighted average of the ranked order.

26. The one or more non-transitory computer-readable media of claim 24 that, when executed by the computing platform, cause the computing platform to:

analyze a knowledge domain available to the enterprise agent;

generate, based on the analyzing, the plurality of widgets, wherein each widget of the plurality of widgets comprises an image text and a hyperlink;

generate the node graph for the plurality of widgets, wherein a node of the node graph represents a widget, and wherein the directed path from the first widget to a second widget indicates that an agent viewing first information included in the first widget will likely view second information included in the second widget, wherein the node graph comprises first, second, and third nodes, wherein the first node corresponds to the first widget, the second node corresponds to the second widget, and the third node corresponds to a third widget;

associate, based on historical data, the directed path with a probability score, wherein the probability score is indicative of a likelihood that an agent viewing the first information included in the first widget will view the second information included in the second widget;

assign a first probability to a first directed path from the first node to the second node, wherein the first probability is indicative that the enterprise agent will utilize the second widget; and assign a second probability to a second directed path from the first node to the third node, wherein the second probability is indicative that the enterprise agent will utilize the third widget, wherein the first and second probabilities are non-zero.

* * * * *